United States Patent
Welch et al.

(10) Patent No.: US 7,108,323 B2
(45) Date of Patent: Sep. 19, 2006

(54) FOLD FLAT STOW IN FLOOR SEAT ASSEMBLY WITH COLLAPSIBLE BOLSTERS

(75) Inventors: Christopher Welch, Farmington Hills, MI (US); Ben Delphia, Norton Shores, MI (US); Jeffrey I. Pontiatowski, Farmington, MI (US)

(73) Assignee: Intier Automotive Inc., Aurora (CA)

( * ) Notice: Subject to any disclaimer, the term of this patent is extended or adjusted under 35 U.S.C. 154(b) by 220 days.

(21) Appl. No.: 10/484,366

(22) PCT Filed: Jul. 18, 2002

(86) PCT No.: PCT/US02/22973

§ 371 (c)(1),
(2), (4) Date: Aug. 11, 2004

(87) PCT Pub. No.: WO03/008230

PCT Pub. Date: Jan. 30, 2003

(65) Prior Publication Data

US 2006/0175874 A1 Aug. 10, 2006

(51) Int. Cl.
*B60N 2/20* (2006.01)
(52) U.S. Cl. .............. 297/284.9; 297/378.1; 297/15; 297/61; 297/411.32
(58) Field of Classification Search .......... 297/378.1, 297/284.1, 284.4, 284.9, 15, 403, 411.32, 297/61
See application file for complete search history.

(56) References Cited

U.S. PATENT DOCUMENTS

| | | | |
|---|---|---|---|
| 3,449,012 A | 6/1969 | Caron | |
| 4,425,910 A | 1/1984 | Meiller | |
| 4,576,411 A | 3/1986 | Kitamura | |
| 4,588,172 A | 5/1986 | Fourrey et al. | |
| 4,601,514 A | 7/1986 | Meiller | |
| 4,636,000 A | 1/1987 | Nishino | |
| 4,699,418 A | 10/1987 | Plavetich | |
| 4,711,494 A | 12/1987 | Duvenkamp | |
| 4,730,871 A | 3/1988 | Sheldon | |
| 4,881,778 A * | 11/1989 | Stephenson et al. | 297/411.39 |
| 5,195,795 A | 3/1993 | Cannera et al. | |
| 5,681,079 A * | 10/1997 | Robinson | 297/61 |
| 5,913,570 A | 6/1999 | Yoshida et al. | |
| 6,068,336 A | 5/2000 | Schonauer | |
| 6,123,380 A | 9/2000 | Sturt et al. | |
| 6,279,996 B1 | 8/2001 | Albrecht | |

* cited by examiner

*Primary Examiner*—Milton Nelson, Jr.
(74) *Attorney, Agent, or Firm*—Clark Hill PLC

(57) ABSTRACT

A seat assembly for use in an automotive vehicle comprising a seat cushion and a eat back pivotally coupled to the seat cushion for movement between a generally upright seating position and a fold flat position resting against the seat cushion. A side bolster panel is pivotally coupled to lateral opposing sides of each of the seat cushion and seat back and operable between a flexed position facing the toward the center of the seat cushion and the seat back and a relaxed position generally flush with the seat cushion and the seat back. A cam mechanism is operatively coupled to the each side bolster panel for automatically releasing the side bolster panels from the flexed position to the relaxed position in response to pivotal movement of the seat back from the seating position to the fold flat position to provide a low profile folded seat assembly.

23 Claims, 6 Drawing Sheets

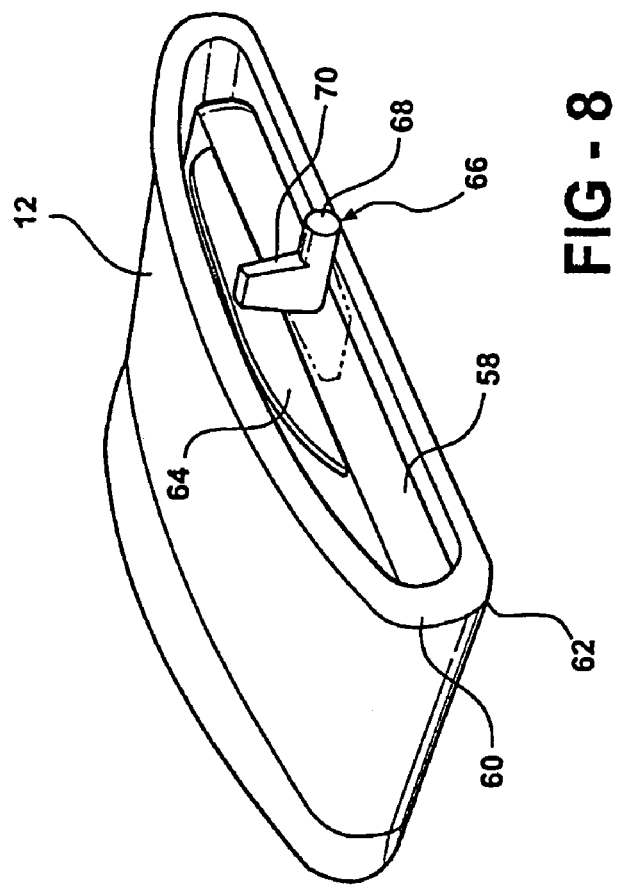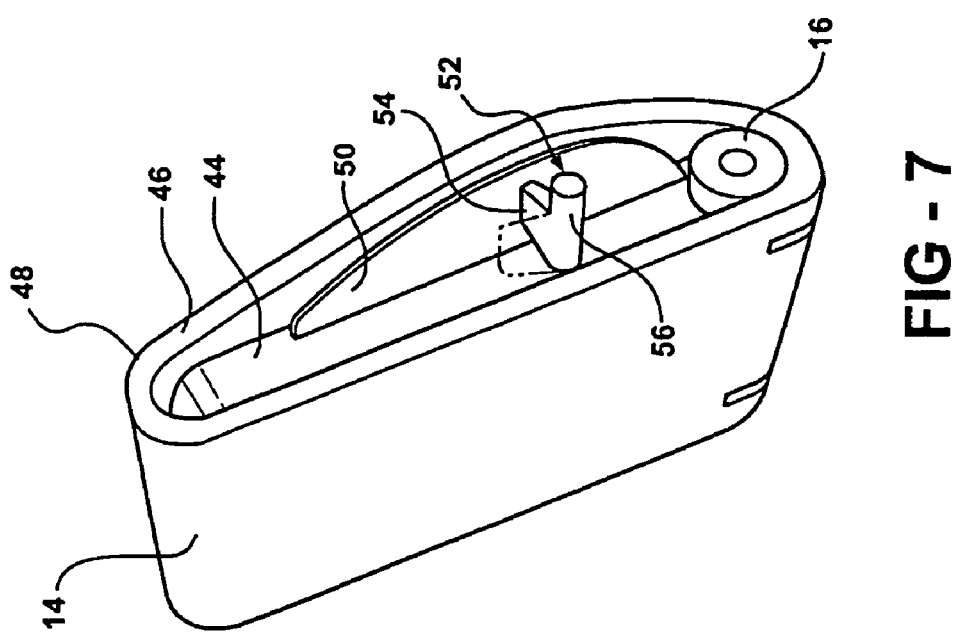

ively coupled to the seat cushion. It is commonly known to provide a seat assembly wherein the seat back is pivotal from an upright seating position for supporting an occupant in the seat to a folded flat position against the seat cushion for stowage. It is also known to provide a tumble seat assembly wherein the seat cushion pivots about the floor of the vehicle with the seat back in the folded flat position to provide addition cargo storage within the compartment of the vehicle.

FOLD FLAT STOW IN FLOOR SEAT ASSEMBLY WITH COLLAPSIBLE BOLSTERS

BACKGROUND OF THE INVENTION

1. Field of the Invention

The subject invention relates to a seat assembly which is folded and stowed within the floor of a vehicle, and more particularly, to a seat assembly having automatically collapsible bolsters and a stowable headrest.

2. Description of the Related Art

Seat assemblies within an automotive vehicle include a seat cushion and a seat back, often pivotally coupled to the seat cushion. It is commonly known to provide a seat assembly wherein the seat back is pivotal from an upright seating position for supporting an occupant in the seat to a folded flat position against the seat cushion for stowage. It is also known to provide a tumble seat assembly wherein the seat cushion pivots about the floor of the vehicle with the seat back in the folded flat position to provide addition cargo storage within the compartment of the vehicle.

The seat cushion and seat back of an automotive seat assembly typically comprise a frame assembly for supporting a contoured cellular foam pad encased by a trim cover. The seat cushion and seat back often include side bolsters provided by thick side areas of the foam pad or mechanical mechanisms such as inflatable air bladders for providing the occupant with side or lateral support when seated in the seat assembly. However, these side bolsters create a thick seat profile and complicate the ability of the seat back to be pivoted to the fold flat position relative to the seat cushion.

Therefore, it is desirable to provide a seat assembly having side bolsters in either or both of the seat back and seat cushion which maintain a thin seat profile in both the folded flat position and the tumbled position for stowage within a bin in the floor of the vehicle.

SUMMARY OF THE INVENTION

According to one aspect of the invention there is provided a seat assembly for use in an automotive vehicle comprising a seat cushion and a seat back pivotally coupled to the seat cushion for movement between a generally upright seating position and a fold flat position resting against the seat cushion. A side bolster panel is pivotally coupled to lateral opposing sides of at least one of the seat cushion and seat back and operable between a flexed position facing toward the center of the seat cushion and the seat back and a relaxed position generally flush with the seat cushion and the seat back. A cam mechanism is operatively coupled to the side bolster panel for automatically releasing the side bolster panel from the flexed position to the relaxed position in response to pivotal movement of the seat back from the seating position to the fold flat position to provide a low profile folded seat assembly.

BRIEF DESCRIPTION OF THE DRAWINGS

Advantages of the present invention will be readily appreciated as the same becomes better understood by reference to the following detailed description when considered in connection with the accompanying drawings wherein:

FIG. 7 is a perspective view of the seat back showing a pivotal side bolster and cam mechanism;

FIG. 8 is a perspective view of the seat cushion showing a pivotal side bolster and a cam mechanism;

DETAILED DESCRIPTION OF THE PREFERRED EMBODIMENT

Figure 1:
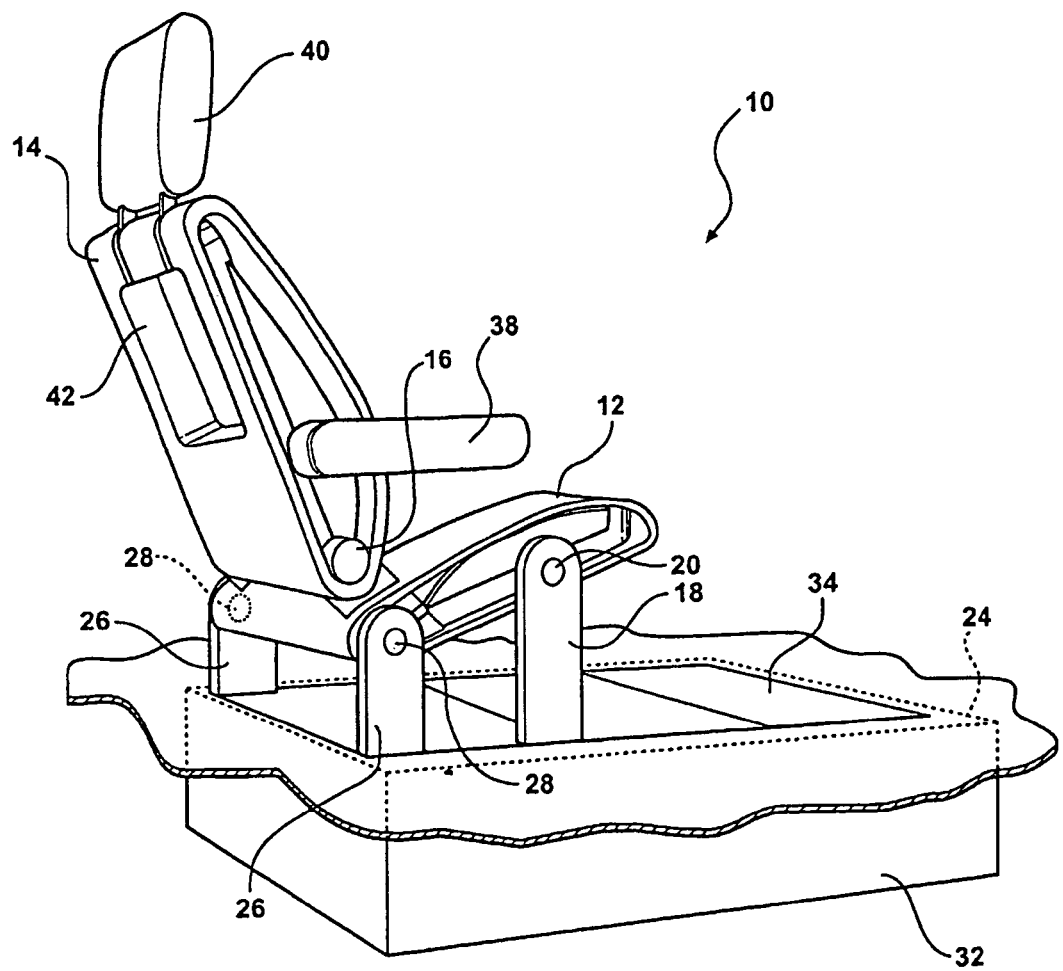
FIG. 1 is a perspective view of the seat assembly according to the subject invention in a seating position.

Referring to the Figures, a seat assembly for use in an automotive vehicle is generally shown at 10 in FIG. 1. The seat assembly 10 includes a seat cushion 12 and a seat back 14 pivotally coupled to the seat cushion 12 by a recliner mechanism 16. The recliner mechanism 16 provides selective pivotal adjustment of the seat back 14 relative to the seat cushion 12 between a plurality of reclined seating positions for supporting an occupant within the seat, as shown in FIG. 1, and a fold flat position pivoted forwardly against the seat cushion 12, as shown in FIG. 2.

Figure 5:
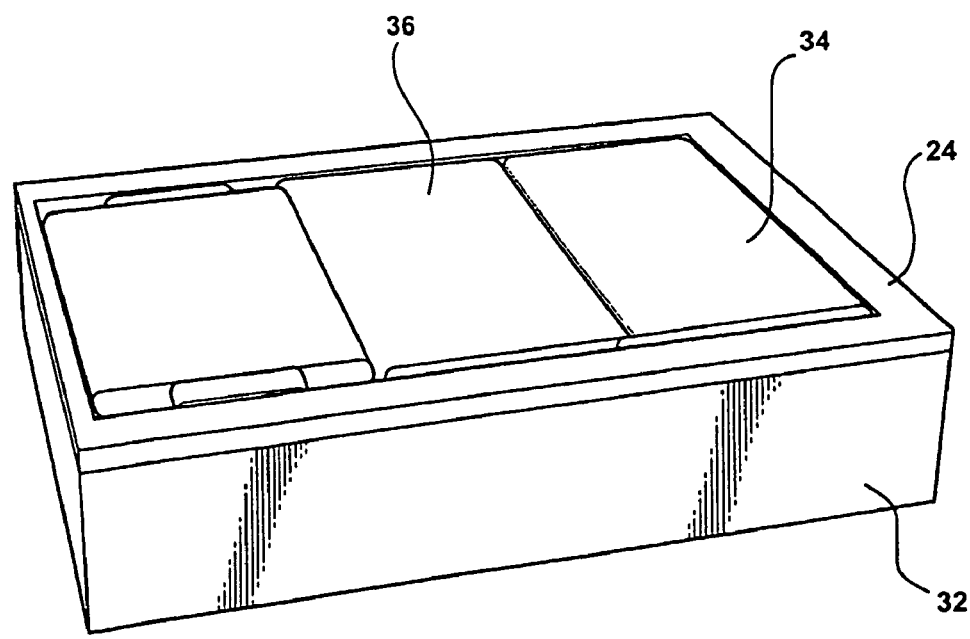
FIG. 5 is a perspective view of the seat assembly in a stowed position within the bin and the cover in the closed position.
Figure 6:
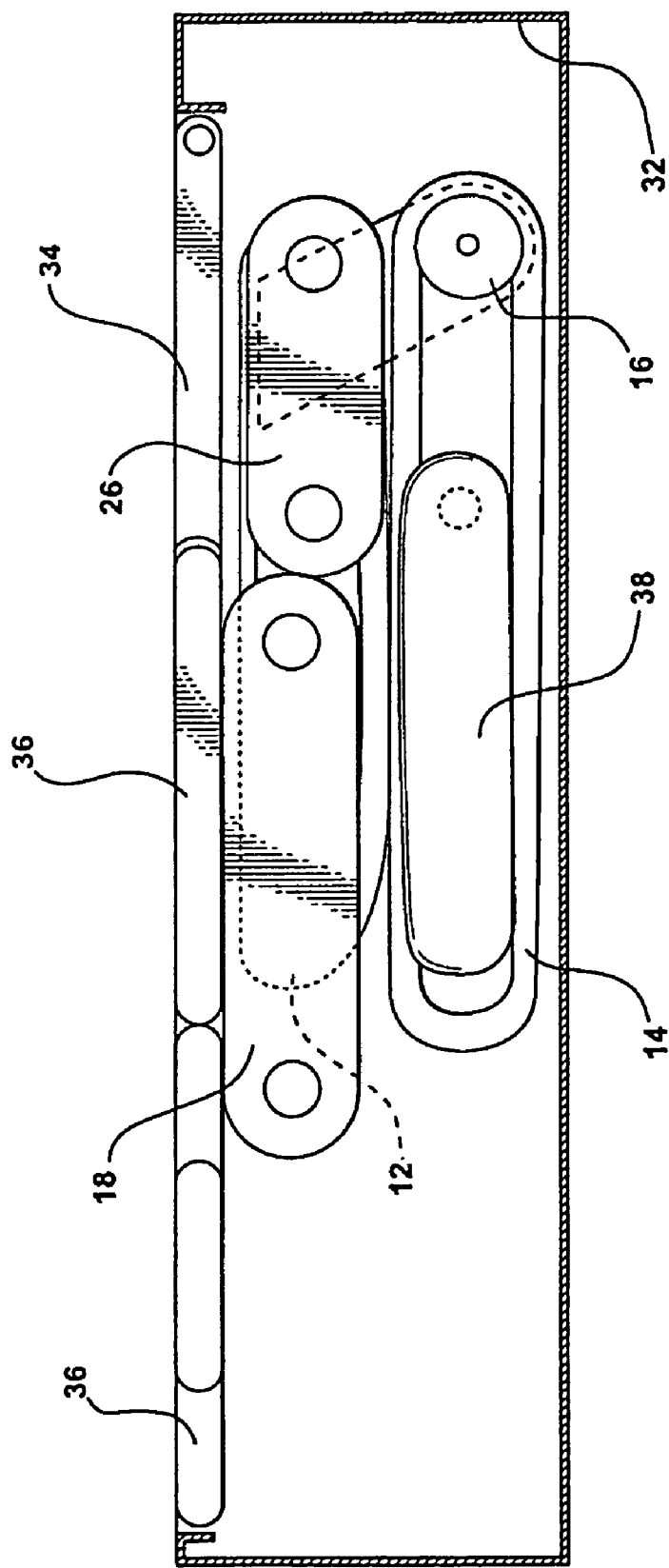
FIG. 6 is a side sectional view of the seat assembly in the stowed position.

The seat assembly 10 further includes a pair of front risers 18 having a first end 20 pivotally coupled to each respective side adjacent the distal end of the seat cushion 12 and a second opposite end 22 pivotally coupled to a planar floor 24 of the vehicle. A pair of rear risers 26 similarly have a first end 28 pivotally coupled to the respective sides of the seat cushion 12 adjacent the seat back 14 and a second opposite end 30 releasably connected to the vehicle floor 24. The front and rear risers 18, 26 support the seat assembly 10 above the vehicle floor 24. The front risers 18 provide rotational movement of the seat assembly 10 between the seating position and fold flat position, shown in FIGS. 1 and 2, and a tumbled position with the seat assembly 10 rotated into a storage bin 32 recessed beneath the floor 24 of the vehicle, as shown in FIGS. 5 and 6.

Figure 4:
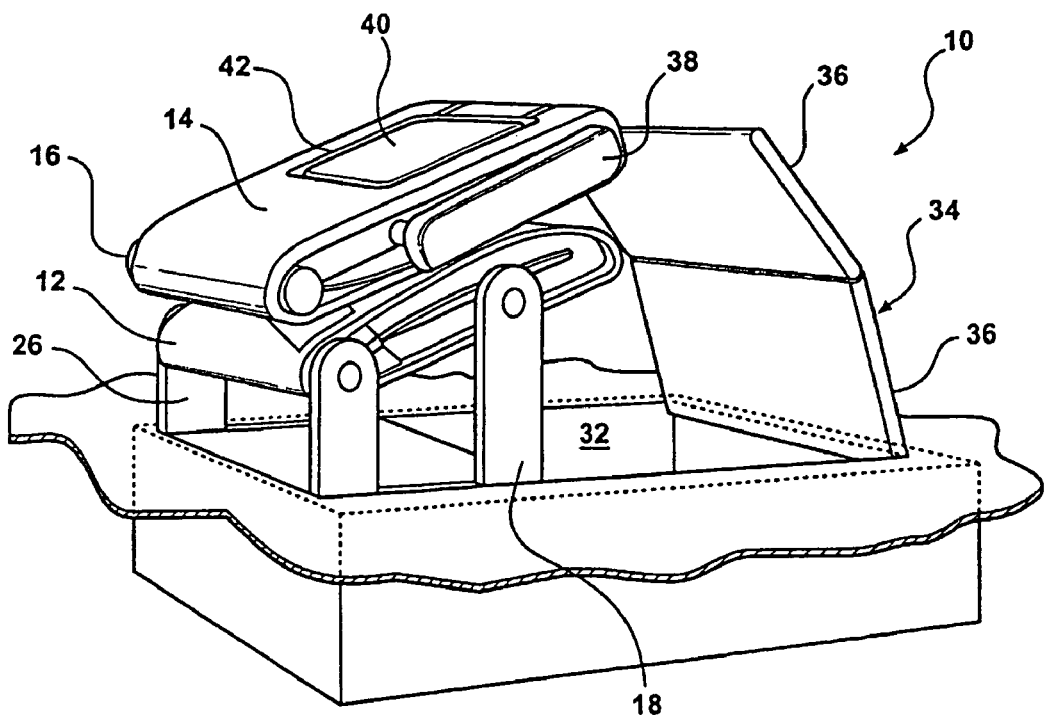
FIG. 4 is a perspective view of the seat assembly in the tumbled position and a bin in the vehicle floor with the cover in the open position.

The storage bin 32 is covered by a lid 34 pivotally connected to the floor 24 for movement between an open position providing access to the bin 32, as shown in FIG. 4, and a closed position covering access to the bin 32, as shown in FIGS. 1, 2, 5 and 6. The lid 34 may include one or more rigid panels 36 pivotally hinged together for providing access to various sections of the bin 32 as desired.

Figure 2:
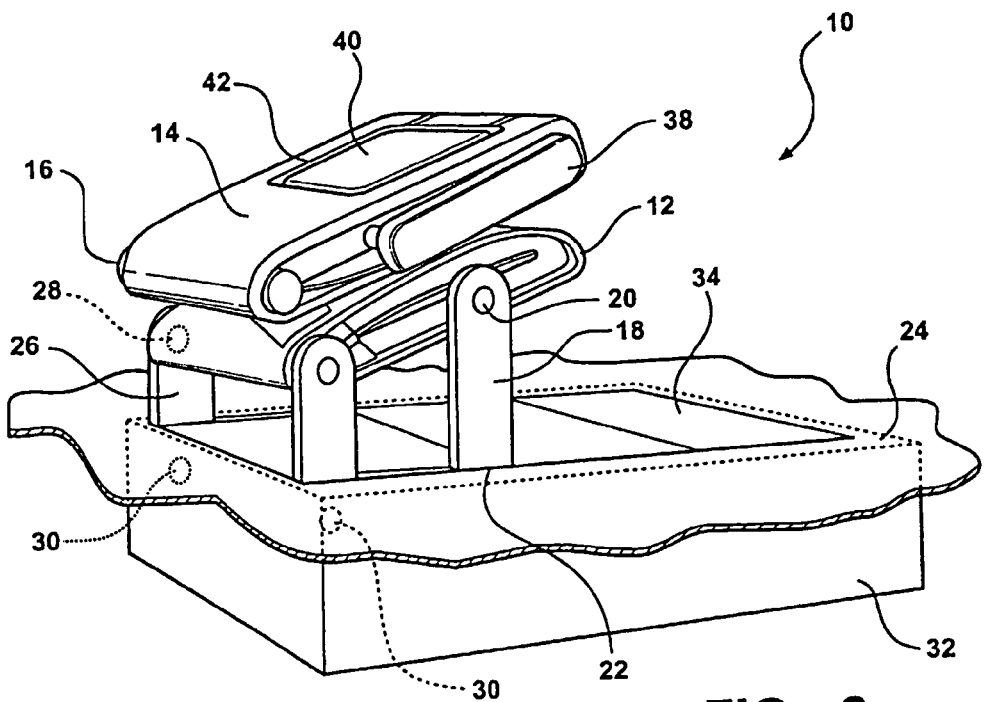
FIG. 2 is a perspective view of the seat assembly in a fold flat position.
Figure 3:
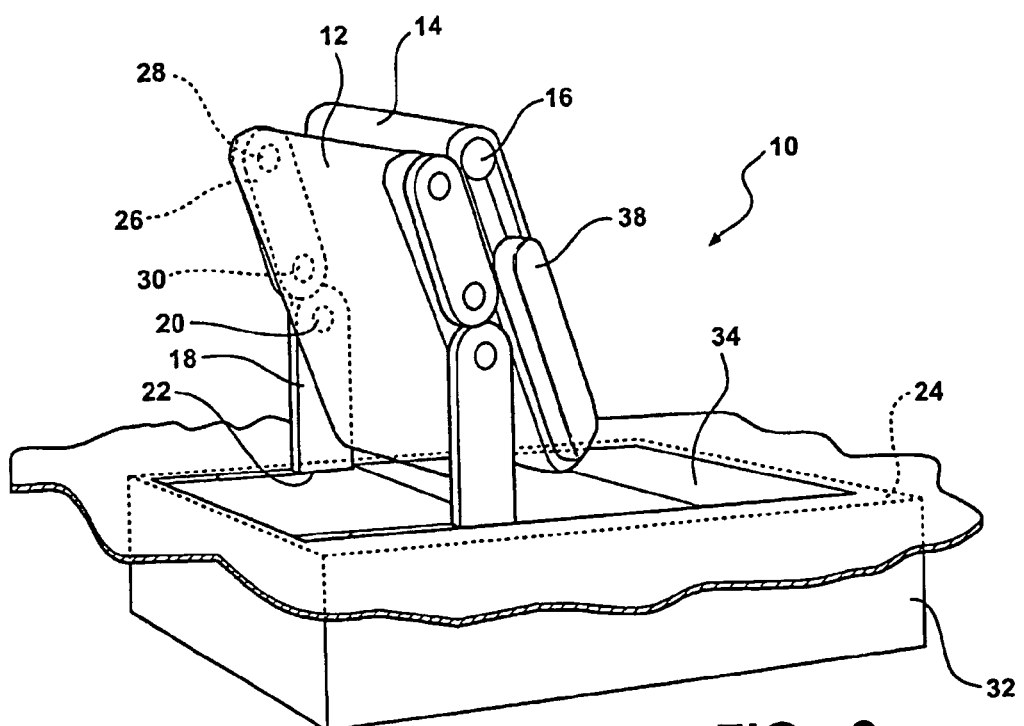
FIG. 3 is a perspective view of the seat assembly in a tumbled position.

The seat assembly 10 also includes an armrest 38 pivotally connected to each lateral side of the seat back 14 for pivotal movement between an extended use position generally parallel with the seat cushion 12, as shown in FIG. 1, and a retracted position aligned flush with the side of the seat back 14, as shown in FIG. 2.

A headrest assembly 40 is operatively coupled to the upper distal end of the seat back 14 and pivotal between a generally upright use position elevated vertically above the seat back 14 for supporting the seat occupant's head, as shown in FIG. 1, and a stowed positioned pivoted rearwardly and recessed within a cavity 42 formed in the back panel of the seat back 14, as shown in FIG. 2.

Referring to FIG. 7, the seat back 14 includes a rigid seat back frame 44 for supporting a contoured cellular foam pad 46 encased in a trim cover 48, such as cloth, leather or vinyl. A semi-rigid side bolster panel 50 is hingedly connected to each opposite lateral side of the rigid frame 44. Each bolster panel 50 is pivotal about its longitudinal axis between a flexed position pivoted inwardly toward the center of the seat back 14 and a relaxed position spread laterally flat and generally flush with the seat back 14. The bolster panels 50 are bias by a spring, or the like, to the relaxed position.

A cam mechanism 52 is also pivotally coupled to each lateral side of the rigid frame 44 behind each bolster panel 50 and generally midway between the opposite ends of the panel 50. The cam mechanism 52 includes a post 54 pivotally connected to the side of the frame 44 and projecting laterally therefrom and a cam lobe 56 extending from the post 54 for engagement with the side bolster panel 50. The armrest 38 is fixedly secured to the post 54 for pivoting the cam lobe 56 between an actuated position pressing the side bolster panel 50 to the flexed position with the armrest 38 in the extended use position and a released position disengaged from the side bolster panel 50 allowing it to return to the relaxed position when the armrest 38 is pivoted to the retracted position.

Referring to FIG. 8, the seat cushion 12 similarly includes a rigid seat cushion frame 58 for supporting a contoured cellular foam pad 60 encased in a trim cover 62, such as cloth, leather or vinyl. A semi-rigid side bolster panel 64 is hingedly connected to each opposite lateral side of the rigid frame 58. Each bolster panel 64 is pivotal about its longitudinal axis between a flexed position pivoted inwardly toward the center of the seat cushion 12 and a relaxed position spread laterally flat and generally flush with the seat cushion 12. The bolster panels 64 are bias by a spring, or the like, to the relaxed position.

Figure 9:
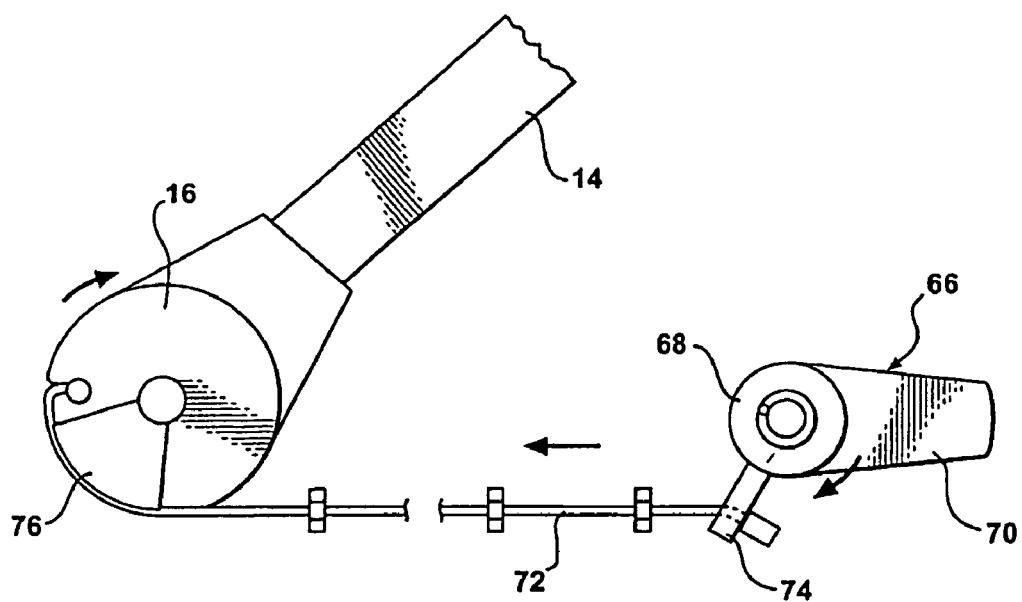
FIG. 9 is a side view of a cam mechanism for actuating the side bolster of the seat cushion.

A cam mechanism 66 is also pivotally coupled to each lateral side of the rigid frame 58 behind each bolster panel 64 and generally midway between the opposite ends of the panel 64. The cam mechanism 66 includes a post 68 pivotally connected to the side of the frame 58 and projecting laterally therefrom and a cam lobe 70 extending from the post 68 for engagement with the side bolster panel 64. Referring to FIG. 9, a push-pull cable 72 is connected between a lever 74 projecting from the cam post 68 and the recliner mechanism 16 on the seat back 14. An arcuate cable guide 76 winds the cable 72 about the recliner 16. When the seat assembly 10 is in the seating position, the cam lobe 70 is pressed against the bolster panel 64 for maintaining the bolster panel in the flexed position. When the seat assembly is rotate from the seating position to the fold flat position, the cable 72 winds about the cable guide 76 and pulls the lever 74 to rotate the cam lobe 70 and disengage the cam lobe 70 from contact with the bolster panel 64, thus allowing the bolster panel 64 to pivot to the relaxed position.

It should be appreciated that a cable mechanism and arrangement similar to that shown in FIG. 8 for the seat cushion 12 may be attached between the recliner mechanism 16 and the post 54 of cam mechanism 52 to rotate the cam lobe 56 and disengage the cam lobe 56 from contact with the bolster panel 50 to allow the bolster panel 50 to automatically pivot to the relaxed position in response to pivotal movement of the seat back 14 between the upright seating position to the fold flat position.

Figure 10:
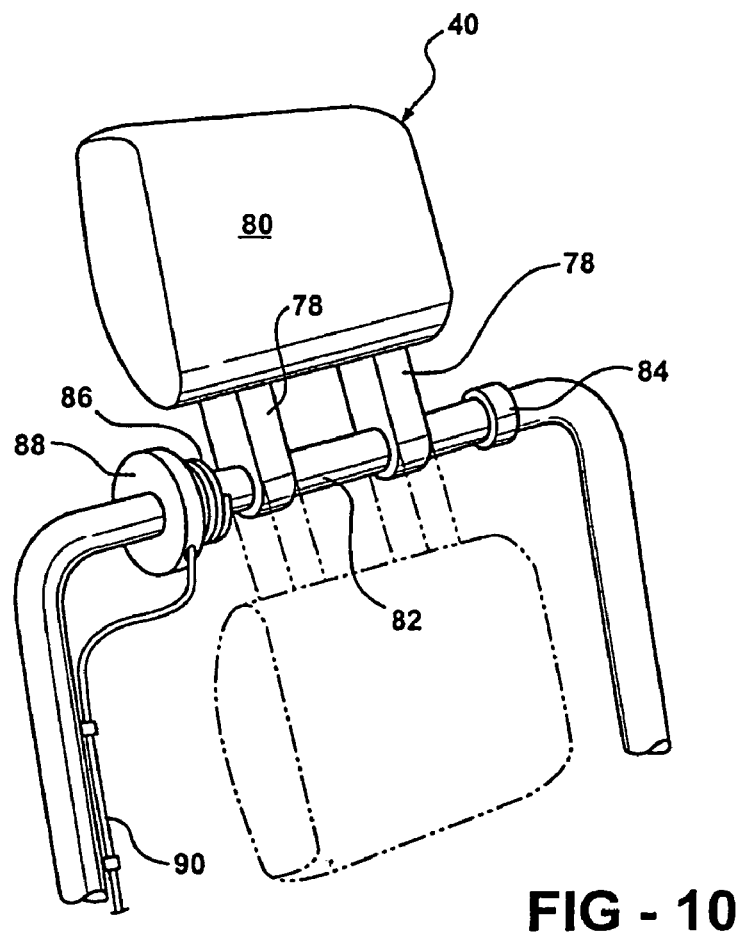
FIG. 10 is a perspective view of a headrest assembly pivotally coupled to the seat back.

Referring to FIG. 10, the headrest assembly 40 further includes a pair of guide posts 78 supporting a foam pad 80 above the seat back 14 in the upright use position. The guide posts 78 are pivotally coupled to a tube 82 rotatably journaled to the top of the seat back frame 44 by a bearing sleeve 84. A coil spring 86 is connected between the seat back frame 44 and the rotatable tube 82 for biasing the headrest 40 to the stowed position. A disc recliner clutch 88 is supported by the seat back frame 44 and operatively coupled to the tube 82 for release the headrest 40 for pivotal movement from the upright use position to the stowed position. A cable 90 is connected between the disc recliner clutch 88 and the recliner mechanism 16. When the seat back 14 is pivoted from the upright seating position to the fold flat position, the cable 90 pulls and releases the disc recliner clutch 88 whereby the spring 86 automatically pivots the headrest 40 from the upright use position to the stowed positioned recessed within the cavity 42 in the back of the seat back 14. When the seat back 14 is returned from the fold flat position to the upright seating position, the headrest 40 may be pivoted to the use position and the cable 90 releases the disc recliner clutch 88 to relock the headrest 40 in the use position.

In operation, to fold and tumble the seat assembly 10 to a stored position recessed within the storage bin 32 beneath the floor 24, the seat back 14 is pivoted from the upright seating position to the fold flat position. The cam mechanisms 52, 66 simultaneously release the cam lobes 56 from the actuated positions to the released position to allow the bolster panels 50, 64 of each of the seat back 14 and seat cushion 12, respectively, to be bias to the relaxed position. The seat back 14 is thus folded relatively flat against the seat cushion 12 to provide a low profile seat assembly 10. Also, when the seat back 14 is pivoted to the fold flat position, the headrest 40 is also automatically rotated from the upright use position to the stowed position recessed within the cavity 42. The cover 34 may then be pivoted to the open position providing access to the storage bin 32. The seat assembly 10 is pivoted about the front risers 18 from the fold flat position to the tumbled position and then further about the second pivotal ends 22 of the front risers 18 into the storage bin 32 in an upside down configuration completely recessed within the storage bin 32. The cover 34 is then pivoted to the closed position covering the bin 32 and seat assembly 10 and providing a flat load floor 24 within the vehicle.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly for use in an automotive vehicle comprising:
   a seat cushion;
   a seat back pivotally coupled to the seat cushion for movement between a generally upright seating position and a fold flat position resting against the seat cushion;
   a side bolster panel pivotally coupled to lateral opposing sides of at least one of said seat cushion and seat back and operable between a flexed position facing toward the center of the seat cushion and seat back and a relaxed position generally flush with the seat cushion and seat back; and
   a cam mechanism operatively coupled to the side bolster panel for automatically releasing the side bolster panel from the flexed position to the relaxed position in response to pivotal movement of the seat back from the seating position to the fold flat position to provide a low profile folded seat assembly.

2. The seat assembly of claim 1 wherein the side bolster panel is pivotally coupled to lateral opposing sides of the seat back.

3. The seat assembly of claim 2 wherein the seat back includes a rigid seat back frame.

4. The seat assembly of claim 3 wherein the side bolster panel is hingedly connected to each opposite lateral side of the rigid seat back frame.

5. The seat assembly of claim 4 wherein the cam mechanism is pivotally coupled to each lateral side of the rigid seat back frame behind each side bolster panel midway between opposite ends of the side bolster panel.

6. The seat assembly of claim 5 wherein the cam mechanism comprises a post pivotally connected to and laterally projecting from the rigid seat back frame, and a cam lobe extending from the post for engagement with the side bolster panel.

7. The seat assembly of claim 6 including an arm rest pivotally connected to each lateral side of the seat back for pivotal movement between an extended use position and a retracted position.

8. The seat assembly of claim 7 wherein the armrest is fixedly secured to the post for pivoting the cam lobe between an actuated position pressing the side bolster panel to the flexed position with the armrest in the extended use position and a released position disengaged from the side bolster panel when the arm rest is in the retracted position.

9. The seat assembly of claim 1 including a recliner mechanism pivotally coupling the seat back and seat cushion.

10. The seat assembly of claim 9 wherein the side bolster panel is pivotally coupled to lateral opposing sides of the seat cushion.

11. The seat assembly of claim 10 wherein the seat back includes a rigid seat cushion frame.

12. The seat assembly of claim 11 wherein the side bolster panel is hingedly connected to each opposite lateral side of the rigid seat cushion frame.

13. The seat assembly of claim 12 wherein the cam mechanism is pivotally coupled to each lateral side of the rigid seat cushion frame behind each side bolster panel midway between opposite ends of the side bolster panel.

14. The seat assembly of claim 13 wherein the cam mechanism comprises a post pivotally connected to and laterally projecting from the rigid seat cushion frame, and a cam lobe extending from the post for engagement with the side bolster panel.

15. The seat assembly of claim 14 including a push-pull cable connected between the post and the recliner mechanism.

16. The seat assembly of claim 15 including an arcuate cable guide associated with the recliner mechanism for winding the cable about the recliner mechanism.

17. The seat assembly of claim 16 wherein the cam lobe is pressed against the side bolster panel for maintaining the side bolster panel in the flexed position when the seat assembly is in the seated position, and wherein the cable winds about the cable guide to rotate the cam lobe away from the side bolster panel for maintaining the side bolster panel in the relaxed position when the seat assembly is in the fold flat position.

18. The seat assembly of claim 1 further including a headrest assembly operatively coupled to an upper distal end of the seat back and pivotal between a generally upright use position and a stowed position.

19. The seat assembly of claim 18 wherein the headrest assembly comprises a pair of guide posts pivotally coupled to a tube rotatably journaled to a top portion of a seat back frame by a bearing sleeve.

20. The seat assembly of claim 19 including a spring connected to the seat back frame and the tube for biasing the headrest assembly to the stowed position.

21. The seat assembly of claim 20 including a disk recliner clutch connected to the tube for releasing the headrest assembly for pivotal movement from the upright use position to the stowed position.

22. The seat assembly of claim 21 including a cable connected between the disk recliner clutch and a recliner mechanism pivotally coupling the seat back and seat cushions.

23. The seat assembly of claim 22 wherein the cable pulls and releases the disk recliner clutch such that the spring automatically pivots the headrest assembly to the stowed position when the seat back is pivoted from the seating position to the fold flat position.

* * * * *

UNITED STATES PATENT AND TRADEMARK OFFICE
CERTIFICATE OF CORRECTION

PATENT NO.        : 7,108,323 B2
APPLICATION NO. : 10/484366
DATED              : September 19, 2006
INVENTOR(S)       : Welch et al.

It is certified that error appears in the above-identified patent and that said Letters Patent is hereby corrected as shown below:

Title page, item (75) Inventors: Please change the third inventor's last name from "Pontiatowski" to --Poniatowski--.

Signed and Sealed this

Third Day of July, 2007

JON W. DUDAS
*Director of the United States Patent and Trademark Office*